United States Patent [19]

Kato et al.

[11] Patent Number: 5,216,047
[45] Date of Patent: Jun. 1, 1993

[54] UNSATURATED POLYESTER RESIN COMPOSITION

[75] Inventors: Kenji Kato; Nariyoshi Koga, both of Oita; Yoshitaka Ikeda, Aichi, all of Japan

[73] Assignee: Nippon Oil and Fats Co. Ltd., Tokyo, Japan

[21] Appl. No.: 604,774

[22] Filed: Oct. 25, 1990

Related U.S. Application Data

[63] Continuation-in-part of Ser. No. 340,915, Apr. 20, 1989, abandoned.

[30] Foreign Application Priority Data

Apr. 25, 1988 [JP] Japan .................. 63-100395

[51] Int. Cl.⁵ .............................................. C08L 67/06
[52] U.S. Cl. ...................................... 523/506; 523/507; 523/508; 523/510; 523/512; 525/44; 525/47
[58] Field of Search ............... 523/506, 507, 508, 510, 523/512

[56] References Cited

U.S. PATENT DOCUMENTS

| 3,010,933 | 11/1961 | Lyon | 523/512 |
| 3,151,182 | 9/1964 | Alexander | 525/47 |
| 3,696,050 | 10/1972 | Werts | 523/508 |

FOREIGN PATENT DOCUMENTS

61-252233  11/1986  Japan ................... 525/38

*Primary Examiner*—Patricia A. Short
*Attorney, Agent, or Firm*—Darby & Darby

[57] ABSTRACT

An unsaturated polyester resin composition contains an unsaturated polyester, a vinyl monomer copolymerizable with the unsaturated polyester, a maleimide compound and a hindered phenolic compound and/or carbon black.

14 Claims, No Drawings

UNSATURATED POLYESTER RESIN COMPOSITION

CROSS-REFERENCE TO RELATED APPLICATION

This application is a continuation-in-part application of Ser. No. 340,915 filed Apr. 20, 1989, now abandoned.

BACKGROUND OF THE INVENTION

This invention relates to an unsaturated polyester resin composition and, more particularly, to an unsaturated polyester resin composition containing an unsaturated polyester, a vinyl monomer, a maleimide compound and a hindered phenolic compound and/or carbon.

The unsaturated polyester resin is extensively used in the form of fiber reinforced plastics by being processed by a method consisting usually in mixing glass fibers and/or inorganic fillers to a resin and heating or curing by curing agents at ambient temperature. More specifically, automotive parts or electrical components are produced by a curing method such as a sheet molding compound method (SMC method) or a bulk molding compound method (BMC method), while fishing boats, sewage purifiers or pool walling members are manufactured by an ambient temperature curing method, such as a hand lay-up method or a spray-up method.

However, the polyester resin composition has a deficiency that it is generally poor in chronological stability and tends to be gelled in a shorter time when preserved during summer. Although it may be contemplated to add ordinary polymerization inhibitors or polymerization retarders in the composition or to store the composition under cooling, it has been found that these measures are hardly effective in eliminating the above mentioned deficiency.

On the other hand, it is also well-known to add carbon black to the unsaturated polyester resin to provide the resin with electrical conductivity or anti-static properties or to process the resin for improving its dyeing properties or strength.

However, the unsaturated polyester resin admixed with carbon black has a deficiency that it can be cured only insufficiently or with delay, such that the curing cycle cannot be improved and, in addition, the surface conditions of the cured molded articles are deteriorated.

In order to remove this deficiency, it has been proposed to add surface-inactivated carbon black selectively to the resin or to use an initiator which is hardly affected by carbon black. However, none of these measures is effective to provide fully satisfactory physical properties.

SUMMARY OF THE INVENTION

It is an object of the present invention to provide an unsaturated polyester resin composition which will give a cured product superior chronological storage stability, a faster curing speed and superior thermal resistance and mechanical properties.

It is another object of the present invention to provide an unsaturated polyester resin composition with which it is unnecessary to use special types of carbon black or initiators, the curing speed proceeding promptly and with which the cured product having satisfactory surface conditions may be obtained.

The above and other objects of the invention will become apparent from the following description.

In accordance with the present invention, there is provided an unsaturated polyester resin composition comprising an unsaturated polyester, a vinyl monomer copolymerizable with the unsaturated polyester, a maleimide compound and an additive selected from the group consisting of a hindered phenolic compound, carbon black and mixtures thereof.

PREFERRED EMBODIMENTS OF THE INVENTION

The present invention will be explained in more detail hereinbelow.

According to the present invention, the unsaturated polyester may be produced by condensing an unsaturated dibasic acid, such as maleic anhydride or fumaric acid or a mixture of the unsaturated dibasic acid with a saturated dibasic acid, such as phthalic anhydride, isophthalic acid, adipic acid or tetrachlorophthalic anhydride with a polyalcohol, such as ethylene glycol, propylene glycohol, 1,3-butylene glycol, 1,4-butanediol, diethylene glycol, dipropylene glycol, neopentyl glycol or bisphenol dioxyethyl ether, preferably in a ratio of 1:0.5 to 2 mols and more preferably in a ratio of 1:1, at 150 to 200° C. under, for example nitrogen. The commercially available unsaturated polyester may also be employed. The acidic value of the unsaturated polyester may preferably be not more than 40.

According to the present invention, the vinyl monomers copolymerizable with the above unsaturated polyester may be enumerated by, for example, styrene, o-chlorostyrene, vinyl toluene, methyl methacrylate, diallyl phthalate, triallyl cyanurate or diallyl benzene phosphonate. The vinyl monomer may be employed alone or as a mixture. The relative content of the above vinyl monomers may preferably be 5 to 70 parts by weight and more preferably 10 to 60 parts by weight to 100 parts by weight of the above unsaturated polyester. The unsaturated polyester may be dissolved into or mixed with the above vinyl monomer.

According to the present invention, the maleimide compound may be represented by the following formula (I) of:

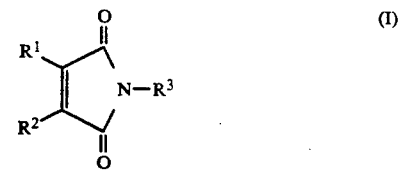

wherein $R^1$ and $R^2$ each represent a hydrogen atom, a methyl group or a halogen atom and $R^3$ represents a hydrogen atom, a straight-chained or branched alkyl group having 1 to 18 carbon atoms, a halogen-substituted alkyl group, a cycloalkyl group, an aryl group having 6 to 12 carbon atoms or an aralkyl group. The maleimide compounds represented by the above formula (I) may include, for example maleimide, N-methyl maleimide, N-ethyl maleimide, N-n-propyl maleimide, N-i-propyl maleimide, N-n-butyl maleimide, N-i-butyl maleimide, N-t-butyl maleimide, N-pentyl maleimide, N-hexyl maleimide, N-2-ethylhexyl maleimide, N-decyl maleimide, N-dodecyl maleimide, N-octadecyl maleimide, N-cyclohexyl maleimide, N-lauryl maleimide, N-stearyl maleimide, N-phenyl maleimide, N-o-methylphenyl maleimide, N-p-isopropyl maleimide, N-o-chlorophenyl maleimide, N-benzyl maleimide, N-o-toluyl maleimide, N-p-toluyl maleimide, N-methylchloro maleimide, N-phenyl-α-methyl maleimide or N-phenylmethyl maleimide.

The relative content of the above maleimide compound to 100 parts by weight of the vinyl monomer may preferably be 0.2 to 50 parts by weight. If the content is less than 0.2 parts by weight, the effect of improving the thermal resistance cannot be exhibited. On the other hand, when the content is in excess of 50 parts by weight, the physical properties of the cured product are undesirably lowered.

The hindered phenolic compound employed in the present invention may be represented by the formula (II)

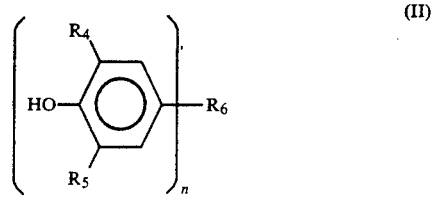

wherein $R_4$ and $R_5$ each stand for an alkyl group having 1 to 4 carbon atoms and $R_6$ stands for

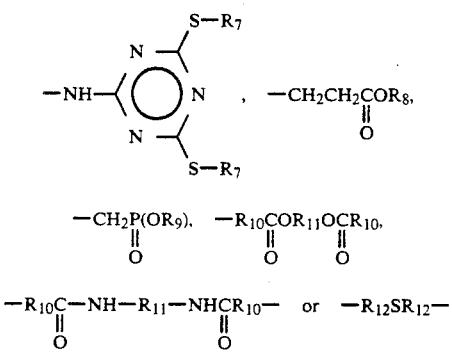

where $R_7$ stands for an alkyl group having 6 to 18 carbon atoms, $R_8$ stands for an alkyl group having 12 to 18 carbon atoms, $R_9$ stands for an alkyl group having 1 to 4 carbon atoms, $R_{10}$ stands for an alkylene group having 1 to 3 carbon atoms, $R_{11}$ stands for an alkylene group having 2 to 6 carbon atoms or $-R_{13}OR_{13}OR_{13}-$, where $R_{13}$ stands for an alkylene group having 1 to 3 carbon atoms, and $R_{12}$ stands for

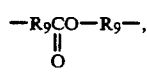

n being a number of 1 or 2. Examples of the hindered phenolic compounds represented by the above formula (II) include 2,4-bis(n-octylthio)-6-(4'-hydroxy-3',5'-di-t-butylanilino)-1,3,5-triazine, triethyleneglycol-bis [3-(3'-t-butyl-5'-methyl-4'-hydroxyphenyl)propionate], octadecyl-3-(3',5'-di-t-butyl-4'-hydroxyphenyl)propionate, 2,2-thiodiethylenebis [3-(3',5'-di-t-butyl-4'-hydroxyphenyl)propionate], 1,6-hexanediol-bis [3-(3',5'-di-t-butyl-4-hydroxyphenyl)propionate, tris-(3,5-di-t-butyl-4-hydroxybenzyl)-isocyanurate, 1,3,5-trimethyl-2,4,6-tris(3',5'-di-t-butyl-4'-hydroxybenzyl)benzene, N,N'-hexamethylenebis(3,5-di-t-butyl-4-hydroxyhydrocinnamide and 3,5-di-t-butyl-4-hydroxybenzylphosphonate-diethylester.

According to the present invention, the hindered phenolic compound is added in an amount of 0.01 to 2 parts by weight and preferably 0.02 to 0.5 part by weight to 100 parts by weight of the resin composition containing the unsaturated polyester, the vinyl monomer and the maleimide compound. The amount of the compound less than 0.01 part by weight is not desirous since the chronological stability is not obtained, whereas the amount of the compound in excess of 2 parts by weight is also not desirous since the curing speed during curing is markedly retarded and the compound is rendered insoluble and precipitated.

Although there is no limitation to the carbon black employed in the present invention, it is preferably selected from the group consisting of furnace black, channel black, thermal black, acetylene black and mixtures thereof. More specifically, commercially available products such as "DENKA ACETYLENE BLACK" manufactured by DENKI KAGAKU KOGYO KK, "ASAHI #80", "XC-550#or "ASAHI#90" manufactured by ASAHI Carbon CO., LTD., "KETCHEN BLACK" manufactured by LION CO., LTD. or "#2350", "MA 100", "4000 B", "#3050", "#3250" or "#3750", manufactured by MITSUBISHI KASEI KOGYO KK, may be employed. The amount of carbon black employed is preferably 1 to 40 parts by weight and more preferably 2 to 30 parts by weight to 100 parts by weight of the unsaturated polyester. The amount of carbon black less than 1 part by weight is not desirous since it is inficient to display the properties of carbon black, whereas the amount of carbon black in excess of 40 parts by weight is also not desirous since there is the risk of bleeding or delayed curing.

For preparing the unsaturated polyester resin composition of the present invention, the unsaturated polyester and the vinyl monomer may be mixed with the maleimide compound under agitation followed by mixing the hindered phenolic compound and/or carbon black, to produce a homogeneous composition. A polymerization inhibitor may be usually added to the reaction system for improving the stability during storage time. For producing a cured product with the use of the unsaturated polyester resin composition, a curing agent such as organic peroxides or a mixture of the organic peroxides with dimethylaniline or cobalt naphthenate. If necessary, the composition may be used in the form of a compound or a prepreg by addition of a filler and/or a reinforcing agent, such as glass fibers or inorganic materials.

The unsaturated polyester resin composition of the present invention is highly useful as the starting material for a variety of molded articles since it has superior chronological storage stability and a higher curing speed and provides cured products having superior thermal resistance and mechanical properties. In addition, it is possible with the unsaturated polyester resin composition of the present invention to expedite the curing during the curing reaction without the necessity of selecting the carbon black or the initiator, while the surface conditions of the produced cured product may be improved. Thus, the present composition may be used advantageously for a variety of automotive parts, electrical or electronic components or precision machine components in place of the conventional unsaturated polyester resin composition.

EXAMPLES OF THE INVENTION

The present invention will be explained in more detail with reference to Examples and Comparative Examples. The present invention is, however, not to be limited to these specific Examples. In the following Examples and Comparative Examples, parts indicate those by weight.

REFERENCE EXAMPLE 1

Preparation of Unsaturated Polyester Resin 78 parts of maleic anhydride, 178 parts of phthalic anhydride and 167 parts of propylene glycol were charged into a four-neck flask fitted with a stirrer, a thermometer, a nitrogen gas blowing pipe and a condenser, and were gradually heated under stirring while a nitrogen gas was caused to flow over the reaction system. The reaction mixture was heated to 145° C. over about one hour and subsequently maintained at 145° C. for one hour. The reaction temperature was raised gradually to and maintained at 210° C. After termination of distillation of condensed water, the acid value of the reaction liquid was measured and found to be equal to 40. The reaction liquid was then cooled and admixed with 200 parts of a styrene monomer to form 560 parts of a homogeneous unsaturated polyester solution.

REFERENCE EXAMPLE 2

Preparation of Maleimide Compound

N-phenylmaleimide was synthesized in accordance with a method described in "Organic Synthesis", Vol.41, page 93. That is, 196 parts of maleic anhydride and 2,000 parts of benzene were charged into a four-necked flask. 186 parts of aniline dissolved in 200 parts of benzene were added dropwise to the resulting solution at 25° C. over one hour. The resulting product was cooled to 10° C. and crystals thus formed were filtered off and dried in vacuo to give 370 parts of a pale yellow solid substance. 316 parts of the produced pale yellow substance, 65 parts of anhydrous sodium acetate and 670 parts of acetic anhydride were charged into a flask fitted with a stirrer and a reflux cooler and heated gradually over an hour. Stirring was continued for one hour while the temperature was maintained at 100° C. The resulting product was poured into ice water to precipitate crystals. The crystals were filtered, washed with petroleum ether and dried to give 220 parts of yellow crystals. The melting point and the purity by liquid chromatography of the produced crystals were measured and found to be 88° C. and 97.5%, respectively. The produced maleimide compounds are shown in Table 1-1.

REFERENCE EXAMPLES 3 TO 5

The maleimide compounds shown in Table 1-1 were prepared in the same way as in Reference Example 2. The purities of the produced maleimide compounds are shown in Table 1-1.

TABLE 1-1

|  | Maleimide Compound | Purity (%) |
| --- | --- | --- |
| Ref. Ex. 2 | N-phenylmaleimide (PMI) | 97.5 |
| Ref. Ex. 3 | N-methylmaleimide (MMI) | 98.8 |
| Ref. Ex. 4 | N-cyclohexylmaleimide (CHMI) | 99.2 |
| Ref. Ex. 5 | N-phenyl-α-methylmaleimide (PMMI) | 92.8 |

EXAMPLE 1-1

5 parts of PMI prepared in Reference Example 2 were added to and dissolved in 95 parts of the unsaturated polyester prepared in Reference Example 1 and 0.05 part of "IRGANOX 1222", a trade name of a hindered phenolic compound manufactured by Ciba Geigy AG, was dissolved in the resulting resin composition. Then, 1 part of t-butyl peroxy benzoate, a curing agent manufactured by NIPPON OIL and FATS CO., LTD. under the trade name of "PERBUTYL Z", was dissolved in the resulting product to produce an unsaturated polyester resin composition. The pot life of the produced unsaturated polyester resin composition, that is the time which elapses until the resin composition becomes gelled and no longer fluid, was measured in a constant air temperature vessel maintained at 25° C. and 40° C. Also the gelation time, the minimum curing time, the maximum heating temperature and the barcoal hardness of the cured product were measured in accordance with JIS K-6901. 0.6 part of 6% cobalt naphthenate was added to the produced unsaturated polyester resin composition. The resulting product was pre-cured at 25° C. for two hours and post-cured at 100° C. for 15 hours to produce a molded plate 3 mm in thickness. In accordance with JIS K-6919, the bending strength and the thermal deformation temperature were measured of test pieces cut from the produced molded plate. The results are shown in Table 1-3. The structural formulas, chemical designations and the trade names of the hindered phenolic compounds are shown in Table 1-2.

EXAMPLE 1-2 AND 1-7

The unsaturated polyester resin compositions were prepared in the same way as in Example 1-1 in accordance with the compositional ratios and amounts shown in Table 1-3 and measurements were conducted of the produced compositions. The results are shown in Table 1-3. The structural formulas, chemical designations and the trade names of the hindered phenolic compounds employed are shown in Table 1-2.

COMPARATIVE EXAMPLES 1-1 TO 1-3

Measurements were conducted in the same way as in Example 1-1 in accordance with the compositional ratios and amounts shown in Table 1-3, except that the hindered phenolic compounds were not used in Comparative Examples 1-1 and 1-2 and additionally the maleimide compound was not used in Comparative Example 1-3. The results are shown in Table 1-3.

From the results of pot life measurement of the Examples and the Comparative Examples 1-1 and 1-2, it has been shown that addition of the hindered phenolic compound results in significantly improved pot life and hence in improved stability with lapse of time. Also, from the comparison of the Example 1-5 and the Comparative Example 1-3, it has been shown that the unsaturated polyester resin composition not containing the maleimide compound exhibits a low thermal deformation temperature and inferior thermal resistance, although it exhibits a long pot life.

TABLE 1-2

| Structural Formula | Designation | Tradename |
|---|---|---|
| t-Bu, HO-⌬-CH₂P(OCH₂CH₃)₂ ‖ O, t-Bu | 3,5-di-t-butyl-4-hydroxy-benzylphosphonate-diethylester | [IRGANOX 1222] mfd. by Chiba-Geigy AG |
| t-Bu, HO-⌬-CH₂CH₂COC₁₈H₃₇ ‖ O, t-Bu | Octadecyl-3-(3',5'-di-t-butyl-4'-hydroxyphenyl)-propionate | [IRGANOX 1076] mfd. by Chiba-Geigy AG |
| t-Bu, HO-⌬-NH-(triazine with SC₈H₁₇ groups), t-Bu | 2,4-bis(n-octylthio)-6-(4'-hydroxy-3',5'-di-t-butyl anilino)-1,3,5-triazyl | [IRGANOX 565] mfd. by Chiba-Geigy AG |
| [CH₃, HO-⌬-CH₂CH₂COCH₂CH₂OCH₂—‖ O, t-Bu]₂ | Triethyleneglycolbis[3-(3'-t-butyl-5'-methyl-4'-hydroxy phenyl)propionate] | [IRGANOX 245] mfd. by Chiba-Geigy AG |
| [t-Bu, HO-⌬-CH₂CH₂COCH₂CH—S ‖ O, t-Bu]₂ | 2,2-thio-diethylenebis[3-(3',5'-di-t-butyl-4'-hydroxy phenyl)propionate] | [IRGANOX 1035] mfd. by Chiba-Geigy AG | t-Bu: tertiary butyl

TABLE 1-3

| | Ex. 1-1 | Ex. 1-2 | Ex. 1-3 | Ex. 1-4 | Ex. 1-5 | Ex. 1-6 |
|---|---|---|---|---|---|---|
| Resin Composition | | | | | | |
| Unsaturated Polyester Resin | Ref. Ex. 1 | Ref. Ex. 1 | Resin of Ortho-Phthalic Type with Medium Reactivity Eporac G-110AL mfd. by Nippon Shokusbai Kagaku Kogyo KK | Resin of Ortho-Phthalic Type with Medium Reactivity Eporac G-110AL mfd. by Nippon Shokusbai Kagaku Kogyo KK | Resin of Iso-phthalic type with High Reactivity Yupika 7500 mfd. by Nippon Yupika Co., Ltd. | Resin of Iso-phthalic type with High Reactivity Yupika 7500 mfd. by Nippon Yupika Co., Ltd. |
| Amount Used (in Parts) | 95 | 90 | 98 | 80 | 90 | 80 |
| Amount Used (in Parts) | PMI | CHMI | PMMI | CHMI | PMI | CHMI |
| of Maleimide Compound | 5 | 10 | 2 | 20 | 10 | 20 |
| Curing Agent* | Perbutyl Z | Perbutyl Z | Nyper B | Perbutyl Z | Nyper B | Perbutyl Z |
| Amount Used (in Parts) | 1 | 1 | 1 | 1 | 1 | 1 |
| Hindered Phenolic Compound | IRGANOX 1222 | IRGANOX 1076 | IRGANOX 245 | IRGANOX 565 | IRGANOX 1035 | IRGANOX 1076 |
| Amount Used (in Parts) | 0.05 | 0.1 | 0.02 | 0.2 | 0.03 | 0.5 |
| Pot life at 40° C. | 18 Days | 25 Days | 10 Days | 23 Days | 11 Days | 14 Days |
| Pot life at 25° C. | 36 Days | 42 Days | 22 Days | 44 Days | 26 Days | 32 Days |
| Curing Test | | | | | | |
| Curing Temperature (°C.) | 120 | 120 | 80 | 120 | 80 | 120 |
| Gelation Time (Minutes) | 0.3 | 0.4 | 83 | 29 | 4.1 | 4.6 |
| Minimum Curing Time (Minutes) | 1.0 | 1.0 | 9.5 | 4.0 | 5.3 | 5.2 |
| Max. Heating Temperature (°C.) | 213 | 215 | 206 | 209 | 253 | 253 |
| Barcol Hardness (Type 934-1) | 39 | 38 | 38 | 40 | 39 | 41 |
| Bending Strength of Molded Plates (kgf/mm²) | 10.3 | 11.4 | 9.2 | 9.8 | 12.5 | 13.5 |
| Thermal Deformation Temperature | 106.2 | 110.2 | 109.8 | 111.4 | 115.4 | 119.6 |

TABLE 1-3-continued of Molded Plates (°C.)

|  |  | Ex. | Comp. Ex. | | |
|---|---|---|---|---|---|
|  |  | 1-7 | 1-1 | 1-2 | 1-3 |
|  | Resin Composition | | | | |
|  | Unsaturated Polyester Resin | Bisphenol Resin Yupika 7123 mfd. by Nippon Yupika Co., Ltd. | Ref. Ex. 1 | Eporac G-110AL | Yupika 7500 |
|  | Amount Used (in Parts) | 95 | 95 | 80 | 100 |
|  | Amount Used (in Parts) of Maleimide Compound | MMI 5 | PMI 5 | CHMI 20 | — |
|  | Curing Agent* | Perbutyl Z | Perbutyl Z | Perbutyl Z | Nyper B |
|  | Amount Used (in Parts) | 1 | 1 | 1 | 1 |
|  | Hindered Phenolic Compound | IRGANOX 565 | — | — | — |
|  | Amount Used (in Parts) | 0.02 | — | — | — |
|  | Pot life at 40° C. | 16 Days | 2 Days | 2 Days | 10 Days |
|  | Pot life at 25° C. | 34 Days | 5 Days | 4 Days | 28 Days |
|  | Curing Test | | | | |
|  | Curing Temperature (°C.) | 120 | 120 | 120 | 80 |
|  | Gelation Time (Minutes) | 3.9 | 0.3 | 2.9 | 8.2 |
|  | Minimum Curing Time (Minutes) | 5.2 | 1.1 | 4.1 | 11.4 |
|  | Max. Heating Temperature (°C.) | 247 | 214 | 210 | 240 |
|  | Barcoal Hardness (Type 934-1) | 40 | 38 | 40 | 34 |
|  | Bending Strength of Molded Plates (kgf/mm$^2$) | 13.6 | 8.3 | 9.7 | 10.4 |
|  | Thermal Deformation Temperature of Molded Plates (°C.) | 110.8 | 106.9 | 110.4 | 105.2 |

*Perbutyl Z (mfd. by Nippon Oil and Fats Co., Ltd) t-butylperoxybenzoate
Nyper B (mfd. by Nippon Oil and Fats Co., Ltd) dibenzoyl peroxide

EXAMPLE 2-1

78 g of maleic anhydride, 178 g of phthalic anhydride and 167 g of propylene glycol were charged into a four-necked flask of 500 ml capacity fitted with a stirrer, a thermometer, a nitrogen gas blowing pipe and a condenser. The resulting mixture was heated gradually under stirring while a nitrogen gas was supplied over the reaction system at a rate of 100 ml/min. The temperature was raised to 150° C. over about one hour and stirring was continued subsequently for about one hour. The reaction temperature was raised gradually so that the temperature at the top of the condenser tower was not in excess of 100° C., and the reaction temperature was maintained at 210° C. After termination of distillation of condensed water, the acid value of the reaction liquid was measured. The reaction was terminated when the acid value reached 40 and the resulting reaction product was cooled. 200 g of a styrene monomer and 50 g of N-methylmaleimide were added to the produced reaction liquid and the resulting mixture was agitated to form a homogeneous mixture. 15 g of carbon black manufactured by Mitsubishi Kasei Kogyo KK under the trade name of "#3150" were added to the resulting mixture under stirring to produce a uniform black-tinted unsaturated polyester resin composition.

EXAMPLES 2-2 TO 2-7

The carbon black and the maleimide compounds shown in Table 2-1 were added to and dissolved in the unsaturated polyester resin prepared in Example 2-1 or the commercially available unsaturated polyester resins containing styrene as a vinyl monomer to produce unsaturated polyester resin compositions. The ingredients and the amounts used are shown in Table 2-1.

TABLE 2-1

| | Preparation of Unsaturated Polyester Resin Composition | | | | | |
|---|---|---|---|---|---|---|
| | Ex. | | | | | |
| | 2-2 | 2-3 | 2-4 | 2-5 | 2-6 | 2-7 |
| Unsaturated Polyester Resin 1) | Resin Prepared in Ex. 2-1 (X) | | Resins of Iso-phthalic Type with Medium Reactivity (Trade Name, Iso-7500) (mfd. by Nippon Yupika Co., Ltd.) (Y) | | Bisphenol Resin (Trade Name, Delacane 411) (mfd. by Showa Kobunshi Co., Ltd.) (Z) | |
| Amount Used (g) | 100 | 100 | 100 | 100 | 100 | 100 |
| Carbon Black Type Filler 2) | Ketchen Black FC mfd. by Lion Co., Ltd. | #3150 (mfd. by Mitsubishi Kasei Co., Ltd.) | #3750 (mfd. by Mitsubishi Kasei Co., Ltd.) | #3750 (mfd. by Mitsubishi Kasei Co., Ltd.) | #MA-100 (mfd. by Mitsubishi Kasei Co., Ltd.) | Gunbai (mfd. by Denki Kagaku Kogyo KK |
| Amount Used (g) | 3 | 20 | 3 | 2 | 2 | 15 |
| N-substituted Maleimide | N-phenyl Maleimide | N-cyclohexyl Maleimide | N-cyclohexyl Maleimide | N-benzyl Maleimide | N-cyclohexyl Maleimide | N-Lauryl Maleimide |
| Amount Used (g) | 2 | 15 | 10 | 5 | 10 | 3 |

1) Mixture Containing 30 to 50 wt. % of Styrene
2) Trade Names

EXAMPLES 2-8 TO 2-17

The curing reaction was conducted on the unsaturated polyester resin compositions prepared in Examples 2-1 to 2-7 under the reaction conditions shown in Table 2-2. Various measurements shown in Table 2-2 the properties of the Comparative Examples are inferior to those of the corresponding Examples.

TABLE 2-2

|  | Ex. | | | | | | |
|---|---|---|---|---|---|---|---|
|  | 2-8 | 2-9 | 2-10 | 2-11 | 2-12 | 2-13 | 2-14 |
| Unsaturated Polyester Resin Composition | Composition Prepared in Ex. 2-1 | Composition Prepared in Ex. 2-2 | Composition Prepared in Ex. 2-3 | Composition Prepared in Ex. 2-4 | Composition Prepared in Ex. 2-5 | Composition Prepared in Ex. 2-3 | Composition Prepared in Ex. 2-4 |
| Curing Temperature (°C.) | 120 | 120 | 120 | 120 | 120 | 120 | 120 |
| Curing Agent and Amount Used (in wt. % based on the Composition) | Perbutyl Z 1.0 | Perbutyl Z 1.0 | Perbutyl Z 1.0 | Perbutyl Z 1.0 | Perbutyl Z 1.0 | Percumyl DCP 1.0 | Percumyl DCP 1.0 |
| Gelatin Time *(in minutes) | 2.7 | 2.8 | 1.8 | 1.4 | 1.6 | 2.8 | 3.6 |
| Curing time *(in minutes) | 3.8 | 2.4 | 3.0 | 2.9 | 3.1 | 3.9 | 4.8 |
| Curing Time − Gelatin Time | 1.1 | 1.6 | 1.2 | 1.5 | 1.5 | 1.1 | 1.2 |
| Max. Heating Temperature (°C.) | 204 | 205 | 208 | 225 | 229 | 227 | 225 |
| Barcoal Hardness | 43 | 51 | 55 | 53 | 48 | 54 | 54 |
| Thermal Deformation Temperature *(°C.) | 95 | 99 | 102 | 105 | 100 | 110 | 105 |
| Cubical Specific Resistance Ωcm | $2.0 \times 10^3$ | $2.6 \times 10^3$ | $4.0 \times 10^3$ | $1.6 \times 10^3$ | $2.6 \times 10^3$ | $2.8 \times 10^3$ | $1.8 \times 10^3$ |
| Surface Conditions | Glossy Pure Black | | | | | | |

|  | Ex. | | | Comp. Ex. | | |
|---|---|---|---|---|---|---|
|  | 2-15 | 2-16 | 2-17 | 2-1 | 2-2 | 2-3 |
| Unsaturated Polyester Resin Composition | Composition Prepared in Ex. 2-5 | Composition Prepared in Ex. 2-6 | Composition Prepared in Ex. 2-7 | (X) *Carbon Black 3750 | (Y) *Carbon Black 3150 | (Z) *Carbon Black MA-100 |
| Curing Temperature (°C.) | 120 | 120 | 120 | 120 | 120 | 120 |
| Curing Agent and Amount Used (in wt. % based on the Composition) | Percumyl DCP 1.0 | Perbutyl Z 1.0 | Percumyl DCP 1.0 | Perbutyl Z 1.0 | Percumyl DCP 1.0 | Perbutyl Z 1.0 |
| Gelatin Time *(in minutes) | 4.0 | 1.2 | 4.0 | 7.0 | 7.8 | 4.4 |
| Curing Time *(in minutes) | 5.1 | 2.0 | 5.2 | 9.2 | 8.7 | 5.2 |
| Curing Time − Gelatin Time | 1.1 | 0.8 | 1.2 | 2.2 | 0.9 | 0.8 |
| Max. Heating Temperature (°C.) | 221 | 235 | 220 | 200 | 220 | 205 |
| Barcoal Hardness | 45 | 44 | 46 | 40 | 41 | 43 |
| Thermal Deformation Temperature *(°C.) | 100 | 98 | 101 | 95 | 98 | 94 |
| Cubical Specific Resistance Ωcm | $2.7 \times 10^3$ | $4.0 \times 10^3$ | $3.0 \times 10^3$ | $2.9 \times 10^3$ | $5.0 \times 10^3$ | $1.8 \times 10^3$ |
| Surface Conditions | Glossy Pure Black | | | Non-Glossy Roughened Surface | | |

*Carbon Black #3750 (Trade Name; mfd. by Mitsubishi Kasei Co., Ltd.)
*Carbon Black #3150 (Trade Name; mfd. by Mitsubishi Kasei Co., Ltd.)
*Carbon Black MA-100 (Trade Name; mfd. by Mitsubishi Kasei Co., Ltd.)
*Gelatin Time; Time which elapsed until the Temperature is raised by 5° C. from curing temperature
*Curing Time; Time which elapsed until the temperature is raised from curling temperature to max. heating temperature
*Thermal Deformation Temperature; Temperature prescribed in JIS K 7207
*Z; t-butyl perbenzoate
*DCP; di-cumyl peroxide were conducted of the produced cured products in accordance with JIS-6901. The results of measurement as well as the curing temperatures, curing agents and the amounts used are shown in Table 2-2.

COMPARATIVE EXAMPLES 2-1 TO 2-3

Using resins X, Y and Z shown in Table 2-1 as the unsaturated polyester resins, curing reaction was carried out under the conditions shown in Table 2-2. Various physical values of the cured products were measured in the same way as in Examples 2-8 to 2-17 in accordance with JIS-6901. The results as well as the curing temperatures, curing agents and the amounts used are shown in Table 2-2.

Meanwhile, the Comparative Examples 2-1, 2-2 and 2-3 represent comparative examples for Examples 2-9, 2-15 and 2-17, respectively. Thus, it has been shown that Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. An unsaturated polyester resin composition comprising an unsaturated polyester, a vinyl monomer copolymerizable with said unsaturated polyester, a maleimide compound and an additive selected from the group consisting of a hindered phenolic compound, carbon black and mixtures thereof, said maleimide compound being represented by the following formula (I) of:

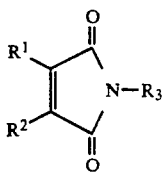

wherein $R^1$ and $R^2$ each represent a hydrogen atom, a methyl group or a halogen atom and $R^3$ represents a hydrogen atom, a straight-chained or branched alkyl group having 1 to 18 carbon atoms, a halogen-substituted alkyl group, a cycloalkyl group, an aryl group having 6 to 12 carbon atoms or an aralkyl group and said hindered phenolic compound being represented by the following formula (II) of:

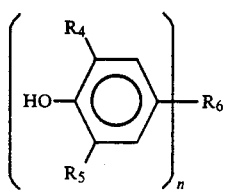

wherein $R_4$ and $R_5$ each stand for an alkyl group having 1 to 4 carbon atoms and $R_6$ stands for

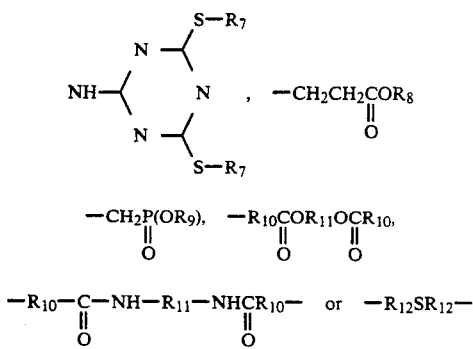

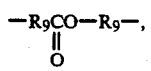

n being a number of 1 or 2.

2. The composition according to claim 1 wherein said unsaturated polyester is produced by condensing an acid selected from the group consisting of an unsaturated dibasic acid and a mixture of an unsaturated dibasic acid and a saturated dibasic acid, and a polyalcohol.

3. The composition according to claim 2 wherein said acid and the polyalcohol are mixed in a ratio of 1 : 0.5 to 2 mols and condensed at 150° to 200° C.

4. The composition according to claim 2 wherein said unsaturated dibasic acid is selected from the group consisting of maleic anhydride, fumaric acid and mixtures thereof.

5. The composition according to claim 2 wherein said saturated dibasic acid is selected from the group consisting of phthalic anhydride, isophthalic acid, adipic acid, tetrachlorophthalic anhydride and mixtures thereof.

6. The composition according to claim 2 wherein said polyalcohol is selected from the group consisting of ethylene glycol, propylene glycol, 1,3-butylene glycol, 1,4-butanediol, diethylene glycol, dipropylene glycol, neopentyl glycol, bisphenol dioxyethyl ether and mixtures thereof.

7. The composition according to claim 1 wherein said vinyl monomer copolymerizable with said unsaturated polyester is selected from the group consisting of styrene, o-chlorostyrene, vinyl toluene, methyl methacrylate, diallyl phthalate, triallyl cyanurate, diallyl benzene phosphonate and mixtures thereof.

8. The composition according to claim 1 wherein said vinyl monomer is mixed in an amount of 5 to 70 parts by weight to 100 parts by weight of said unsaturated polyester.

9. The composition according to claim 1 wherein the maleimide compound represented by the formula (I) is selected from the group consisting of maleimide, N-methyl maleimide, N-ethyl maleimide, N-n-propyl maleimide, N-i-propyl maleimide, N-n-butyl maleimide, N-i-butyl maleimide, N-t-butyl maleimide, N-pentyl maleimide, N-hexyl maleimide, N-2-ethylhexyl maleimide, N-decyl maleimide, N-dodecyl maleimide, N-octadecyl maleimide, N-cyclohexyl maleimide, N-lauryl maleimide, N-stearyl maleimide, N-phenyl maleimide, N-o-methylphenyl maleimide, N-p-isopropyl maleimide, N-o-chlorophenyl maleimide, N-benzyl maleimide, N-o-toluyl maleimide, N-p-toluyl maleimide, N-methylchloro maleimide, N-phenyl-o-methyl maleimide, N-phenylmethyl maleimide, and mixtures thereof.

10. The composition according to claim 1 wherein said maleimide compound is mixed in an amount of 0.2 to 50 parts by weight to 100 parts by weight of said vinyl monomer.

11. The composition according to claim 1 wherein said hindered phenolic compound represented by the formula (II) is selected from the group consisting of 2,4-bis(n-octylthio)-6-(4'-hydroxy-3',5'-di-t-butylanilino)-1,3,5-triazine, triethyleneglycol-bis [3-(3'-t-butyl-5'-methyl-4'-hydroxyphenyl)propionate], octadecyl-3-(3'5'-di-t-butyl-4'-hydroxyphenyl)propionate, 2,2-thio-diethylenebis [3-(3',5'-di-t-butyl-4'-hydroxyphenyl)propionate], 1,6-hexanediol-bis [3-(3',5'-di-t-butyl-4-hydroxyphenyl)propionate], tris-(3,5-di-t-butyl-4-hydroxybenzyl)-isocyanurate, 1,3,5-trimethyl-2,4,6tris-(3',5'-di-t-butyl-4'-hydroxybenzyl)benzene, N,N'-hexamethylenebis-(3,5-di-t-butyl-4'-hydroxybenzyl)benzene, 3,5-di-t-butyl-4-hydroxybenzylphosphonate-diethylester and mixtures thereof.

12. The composition according to claim 1 wherein said hindered phenolic compound is mixed in an amount of 0.01 to 2 parts by weight to 100 parts by weight of a mixture of said unsaturated polyester, said vinyl monomer and said maleimide compound.

13. The composition according to claim 1 wherein said carbon black is selected from the group consisting of furnace black, channel black, thermal black, acetylene black and mixtures thereof.

14. The composition according to claim 1 wherein said carbon black is mixed in an amount of 1 to 40 parts by weight to 100 parts by weight of said unsaturated polyester.

UNITED STATES PATENT AND TRADEMARK OFFICE
CERTIFICATE OF CORRECTION

PATENT NO. : 5,216,047
DATED : 06/01/93
INVENTOR(S) : Kato et al.

It is certified that error appears in the above-identified patent and that said Letters Patent is hereby corrected as shown below:

In column 12, lines 64 to 66, please delete "an additive selected from ... and mixtures thereof," and insert --a hindered phenolic compound and carbon black,--.

In column 14, lines 35 to 36, please change "N-phenyl-o-methyl maleimide" to N-phenyl-$\alpha$-methyl maleimide--.

In column 14, lines 51 to 52, please change "1,3,5-trimethyl-2,4,6tris-(3',5'-di-t-butyl-4'-hydroxybenzyl)benzene" to --1,3,5-trimethyl-2,4,6-tris-(3',5'di-t-butyl-4'-hydroxybenzyl)benzene--.

In column 14, lines 53 to 54, please change "N,N'-hexamethylenebis-(3,5-di-t-butyl-4'-hydroxybenzyl)benzene" to --N,N'-hexamethylenebis(3,5-di-t-butyl-4-hydroxyhydrocinnamide---.

Signed and Sealed this

Third Day of May, 1994

Attest:

BRUCE LEHMAN

Attesting Officer

Commissioner of Patents and Trademarks